United States Patent [19]

Wain et al.

[11] Patent Number: 5,037,157
[45] Date of Patent: Aug. 6, 1991

[54] ARMREST ARRANGEMENTS FOR VEHICLE SEATING

[75] Inventors: Nicholas D. Wain, High Wycombe; Godfrey J. Shepheard, Leighton Buzzard, both of England

[73] Assignee: Flight Equipment & Engineering Ltd., United Kingdom

[21] Appl. No.: 174,189

[22] Filed: Mar. 28, 1988

[30] Foreign Application Priority Data

Mar. 28, 1987 [GB] United Kingdom ............... 8707485

[51] Int. Cl.⁵ ............................................. A47C 7/62
[52] U.S. Cl. ................................. 297/194; 297/193; 297/124; 297/417
[58] Field of Search ............... 297/194, 232, 193, 124, 297/127, 417, 115, 146

[56] References Cited

U.S. PATENT DOCUMENTS

| | | |
|---|---|---|
| 3,145,052 | 8/1964 | Morgan . |
| 3,336,077 | 8/1967 | Radke et al. .................. 297/193 |
| 4,141,586 | 2/1979 | Goldner et al. ............ 297/417 X |
| 4,533,175 | 8/1985 | Brennan . |
| 4,668,010 | 5/1987 | Fujiwara ..................... 297/417 X |
| 4,685,729 | 8/1987 | Heesch et al. ................... 297/193 |

Primary Examiner—Laurie K. Cranmer
Attorney, Agent, or Firm—Watson, Cole, Grindle & Watson

[57] ABSTRACT

Vehicle seats are commonly used to transport passengers travelling on different classes of fare, for which seats of different width are often provided. Seats of different width are also desirable to accommodate passengers of different sizes. Adjustable seating units are known which include backrest and bottom parts for a plurality of seats abreast, fixed armrests at the sides and intermediate armrests which can be moved laterally between two or more predetermined positions to separate and define seats of different widths. To improve the appearance and comfort provided by such adjustable seating units, a shroud is provided to fit on or over two intermediate armrests when they are positioned close together between wider seats, the shroud being anchored to the seating unit, for example being mounted on arms pivotally connected to the seating unit, so as to be movable between an operative position, fitting the intermediate armrests, and a stored position. In its stored position, the shroud may be concealed at least partially by a part of the seating unit, such as a movable portion of the backrest or of the bottom part. The shroud may be upholstered and may include recesses for receiving articles to be stored or facilities which are required to be available only when it is in its operative position.

10 Claims, 2 Drawing Sheets

ARMREST ARRANGEMENTS FOR VEHICLE SEATING

BACKGROUND OF THE INVENTION

1. Field of the Invention

In passenger-carrying vehicles, particularly aircraft, it is common to provide seats of different widths for passengers travelling on different classes of fare. For example, a seat provided for passengers travelling "First Class" is usually wider (and designed to provide greater comfort) than a seat provided for passengers travelling on the "Tourist Class" fare. Seats of different widths are also desirable to provide improved comfort for different sizes of passenger.

Vehicles are commonly used to transport passengers travelling on different classes of fare. The numbers of passengers travelling on the different classes is likely to vary form one journey to another. It is therefore a common practice to provide an adjustable seating unit comprising at least one backrest part and at least one bottom part for a plurality of seats abreast, fixed armrests at the sides of the unit and laterally-movable intermediate armrests defining and separating the seats. The intermediate armrests are movable laterally so that the width of the seats can be adjusted, for example between journeys, to accommodate passengers in different fare classes. This invention concerns armrest arrangements for adjustable seating units of this kind for use in passenger-carrying vehicles, which will for convenience be referred to as "adjustable seating units of the kind described".

In its simplest form, an adjustable seating unit of the kind described comprises a backrest part and a bottom part for two seats abreast, with a fixed armrest at each side and two intermediate armrests, each seat being defined by an intermediate armrest and the adjacent fixed armrest and the two seats being separated by the two intermediate armrests. Each intermediate armrest can be moved laterally between two or more predetermined positions to define seats of different widths.

Typically, a "First Class" seat for an aircraft has an overall width up to about one-and-a-half times the width of a "Tourist Class" seat. It is therefore convenient to make an adjustable seating unit of the kind described of overall width sufficient to provide a row of three seats abreast for "Tourist Class" passengers. Such a unit can be adjusted readily to provide two wider seats abreast for "First Class" passengers. Two intermediate armrests are provided, each of which can be located in two alternative laterally-spaced positions. In the first position, all four armrests are equally spaced, defining seats for three "Tourist Class" passengers. In the second position, the two intermediate armrests are each located closer to the centre of the row so as to define with the fixed armrests two wider seats for "First Class" passengers.

2. Description of the Related Art

U.S. Pat. No. 3,145,052 discloses one arrangement (believed to be the first) of an adjustable seating unit as described in the previous paragraph. Each intermediate armrest is supported by a tubular strut which can be inserted selectively into either of two laterally-spaced sockets in the alternative positions. A removable table is provided to bridge the intermediate armrests when they are in the two-seat configuration. A disadvantage of this arrangement is that the intermediate armrests and/or the removable table can readily be removed from the unit and may be lost.

U.S. Pat. No. 4,768,832 discloses an adjustable seating unit of the kind described in which each intermediate armrest is anchored to a fixed part of the seating unit by a linkage and complementary components are provided on the intermediate armrests and the seating unit for selective engagement to locate the intermediate armrests positively in their respective positions. This avoids loss of the intermediate armrests.

An adjustable seating unit of the kind described, of overall width sufficient to provide a row of three seats abreast and adjustable to provide two wider seats, is disclosed in a document of Trans-Australia Airlines dated Sept. 3, 1979 and entitled "B727-276—Passenger Tables". Inter alia, the document discloses a separate wide armcap to fit over the two intermediate armrests when they are positioned close together in the two-seat configuration. When the unit is in the three-seat configuration, the wide armcap is stored in a pocket under one of the seats. It seems that fitting of the wide armcap to the intermediate armrests would be a two-handed operation since the document instructs that this operation should be performed "holding the edges apart". As the wide armcap is a separate component, it could easily be misplaced, lost or damaged.

U.S. Pat. No. 4,533,175 discloses another adjustable seating unit which provides either two wider seats or three narrower seats abreast. There are fixed armrests at the sides of the unit and intermediate armrests are provided which are movable between two positions. In the three-seat configuration the intermediate armrests project vertically out of the lower seat cushion to define and separate three seats of equal width. In the two-seat configuration the intermediate armrests are pivoted down to overlie the centre seat position in a generally ineffective horizontal fashion and the centre part of the back cushion is swung down to form an alternative wider armrest and/or cocktail table to separate and define the two wider seats.

SUMMARY OF THE INVENTION

An object of this invention is to provide an adjustable seating unit of the kind described for use in a passenger-carrying vehicle with a shroud to fit on or over two intermediate armrests when they are positioned close together between wider seats, the shroud being anchored to the seating unit and movable between an operative position in which it fits on or over the intermediate armrests and a stored position. Preferably the shroud can be concealed at least partially when in its stored position by a portion of the seating unit which is movable to permit the shroud to move between its operative and stored positions.

Being anchored to the seating unit, the shroud cannot be misplaced or lost. Preferably, the shroud is mounted on arms pivotally connected to the seating unit. The shroud may be slidably mounted on the arms and/or the arms may be articulated to provide the necessary movement of the shroud between operative and stored positions.

The portion of the seating unit by which the shroud is at least partially concealed in its stored position may be a backrest part or a bottom part or a portion of one of those parts. The shroud may have recesses in its surface which will be uppermost when it is in its operative position, to receive articles which a passenger may require during a journey and/or it may include facilities which are required to be available to passengers only when the wider seats are available for use, such as the control for a recline mechanism or a socket for audio or other facilities. Its uppermost surface may also include padded or upholstered areas to provide increased comfort for passengers and/or to complete concealment of the shroud when in its stored position.

BRIEF DESCRIPTION OF THE DRAWING

Embodiments of the invention are illustrated by way of example by the accompanying drawings, in which.

DESCRIPTION OF THE PREFERRED EMBODIMENTS

Figure 1:
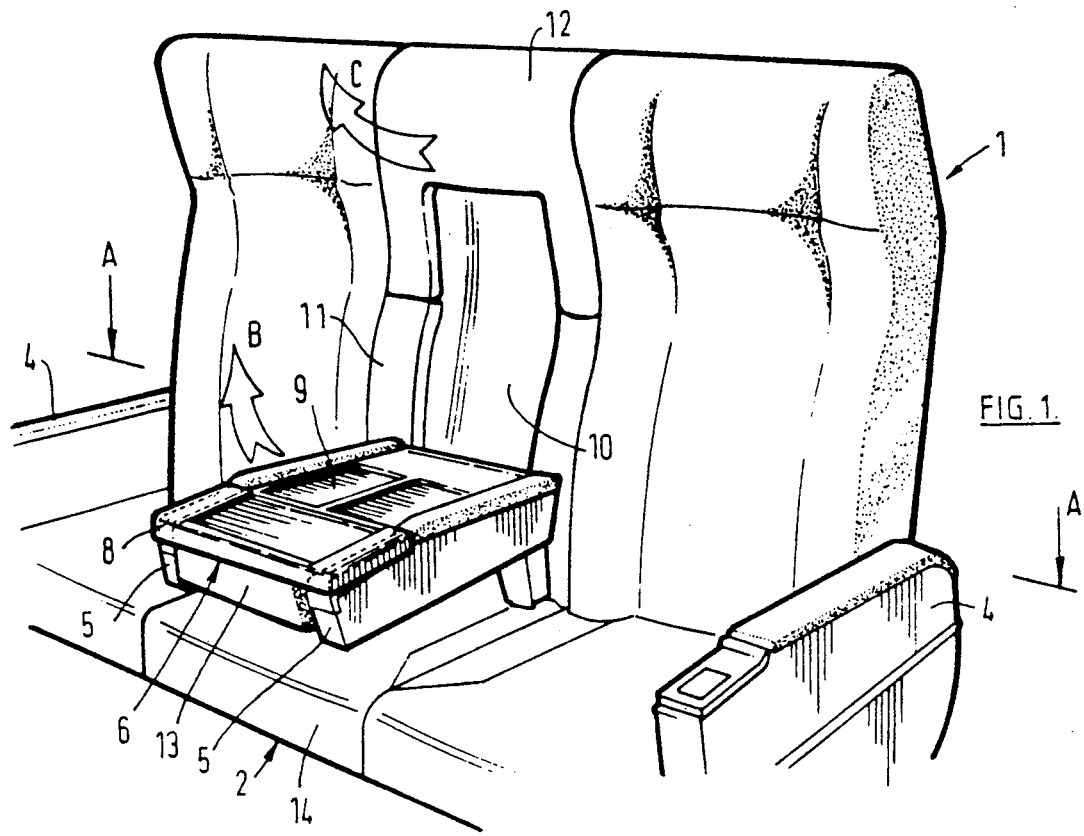
FIG. 1 is a perspective view, from the front and one side, of part of an adjustable seating unit of the kind described.
Figure 2:
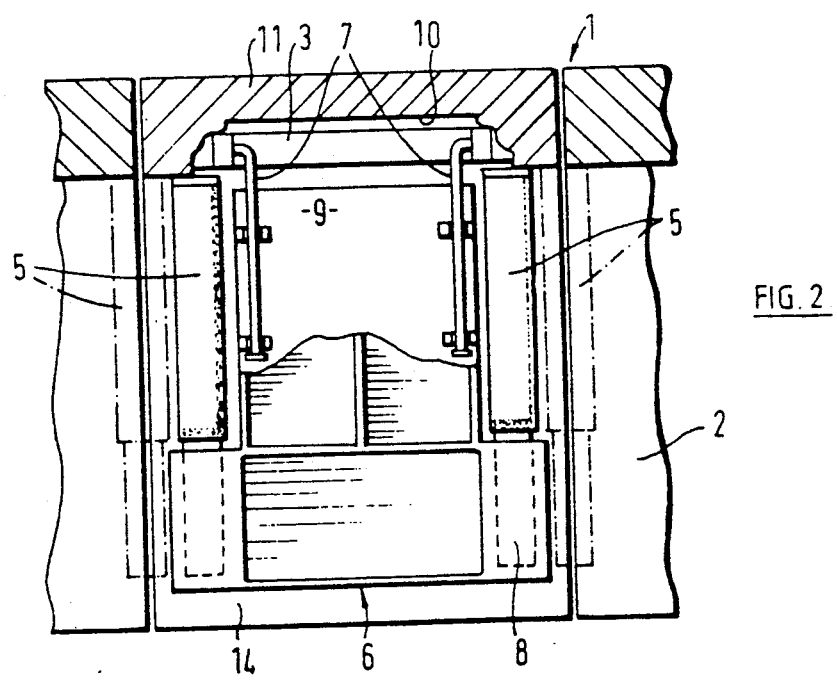
FIG. 2 is a plan view of the middle part of the seating unit, partly sectioned on the line A—A in FIG. 1.

Referring first to the embodiment shown in FIGS. 1 and 2, the adjustable seating unit comprises a backrest part 1 and a bottom part 2, mounted in the usual manner on a support frame 3 (partly shown in FIG. 2) to be mounted in a vehicle such as an aircraft. Each of the parts 1 and 2 is of overall width sufficient to provide a row of three seats abreast for "Tourist Class" passengers and is divided into three separate elements, each of width appropriate for one of these seats. Fixed armrests 4 are mounted at the sides of the unit and two movable intermediate armrests 5 are provided, each of which can be located in two alternative positions, as shown in FIG. 2. In their first positions, shown in chain dotted lines, they are spaced equally from the fixed armrests 4 and from each other so as to define and separate the three seats. In their second positions, shown in full lines (the position in which they are shown in FIG. 1), they define with the respective fixed armrests 4 two wider "First Class" seats and have a narrower space between them. To cover this space and give a neat appearance, a shroud 6 is slidably mounted on arms 7 pivoted to a part of the frame 3 of the unit. In its operative position shown, the shroud 6 fits on the intermediate armrests 5. It is of T shape in plan, with a wider part 8 which rests on and fits over the front parts of the intermediate armrests 5 when they are in their second positions and a narrower part 9 which lies between their upholstered rear parts. Its upper surface is recessed to receive articles which passengers may wish to keep conveniently at hand during a journey.

From its operative position shown in FIG. 1, the shroud 6 may be swung upwardly, as indicated by the arrow B in FIG. 1, to a stored position in a recess 10 in the middle element 11 of the backrest part 1. A portion 12 of the upholstery of the middle element 11 which covers the upper side portions of the recess 10 is hinged at or near its top edge so that it can be raised, as indicated by the arrow C in FIG. 1, to reveal the whole recess 10. As the shroud 6 is swung upwardly, it is slid inwardly along the arms 7 to allow its wider part 8 to enter the recess 10 behind the upholstery portion 12, which can then be restored to the position shown so as to conceal the outer ends of the wider part 8 of the shroud. On the lower surface of the shroud 6, which is outer most when it is in its stored position, is mounted a portion of upholstery 13 to fit in the recess 10 below the portion 12 so as to continue the seating surface of the backrest when the shroud is in its stored position. The shroud is then completely concealed behind the backrest seating surface.

When it is desired to convert the seating unit from the two-seat "First Class" configuration shown in FIG. 1 to the three-seat "Tourist Class" configuration, it is a simple matter to raise the upholstery portion 12 and swing the shroud 6 upwardly and slide it inwardly along the arms 7 so that it enters the recess 10, restore the upholster portion 12 and then move the intermediate armrests 5 outwardly to their first positions. Conversion in the opposite direction is equally simple. The shroud cannot be separated from the unit.

Figure 3:
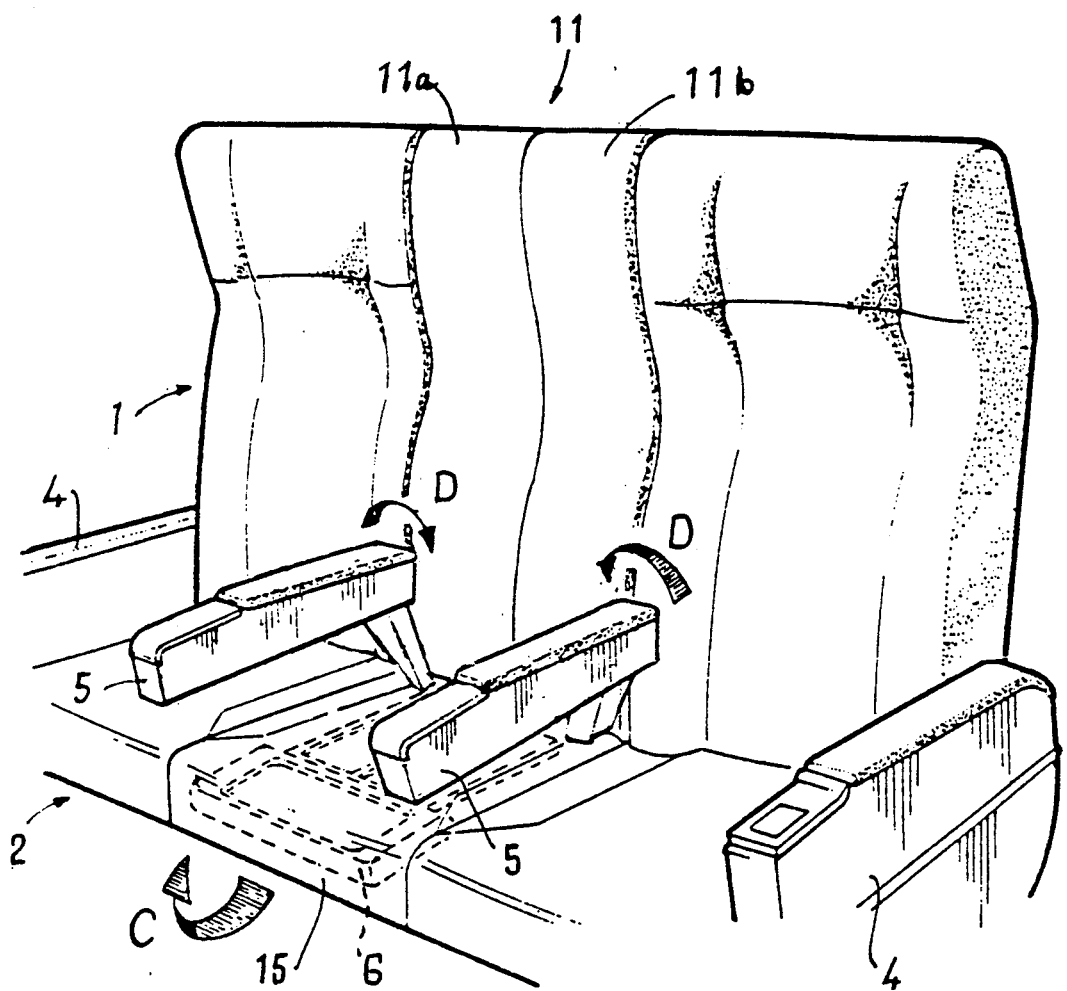
FIG. 3 is a perspective view, from the front and one side, of part of a different adjustable seating unit of the kind described.

FIG. 3 shows an alternative embodiment which, whilst generally similar to the embodiment of FIGS. 1 and 2, has a different arrangement for storage of the shroud. The parts 1 to 6, 8 and 9 are generally similar to those of the previous embodiment and are indicated by the same reference numbers. In this embodiment, the middle element 15 of the bottom part 2 of the seating unit is removable. The shroud 6 is mounted on articulated arms (not shown) which are pivoted to the frame 3 like the arms 7 in FIG. 1 so that it can be lowered when the element 15 is removed and the intermediate armrests 5 are in their first positions in which the space between them is sufficient for the wider part 8 of the shroud to pass. The shroud will then rest in a stored position as shown on a part of the frame 3 and the element 15 can be replaced over it so that the unit provides three "Tourist Class" seats of equal width and the shroud is completely concealed. To convert the seating unit to the two-seat configuration, the element 15 is removed and the shroud 6 is lifted above the intermediate armrests 5 as indicated by the arrow C. The element 15 is replaced below the shroud and the intermediate armrests 5 are moved to their second positions as indicated by the arrows D. The shroud can then be lowered to rest on the intermediate armrests 5 just as shown in FIG. 1. In this alternative embodiment, the middle element 11 of the backrest part 1 is not recessed so the unit has a neater appearance in the two-seat configuration than the embodiment of FIGS. 1 and 2. Furthermore, it may be divided centrally into two portions, 11a and 11b, which can be connected in known manner by internal bolts (not shown) to the respective outer elements 16 of the backrest part 1 so as to form effective wider independent backrests for the wider seats. No upholstery is necessary on the underside of the shroud 5 so it occupies less space in the stored position and is easily accommodated below the element 15. If desired, the element 15 may be hinged to the frame at or near its front edge instead of being removable.

In both embodiments illustrated and in other embodiments of the invention, the intermediate armrests 5 may be, and preferably are, anchored to the seating unit by linkages and complementary components are provided on the intermediate armrests and on the seating unit for selective engagement to locate the intermediate armrests positively in their respective positions, as described in U.S. Pat. No. 4,768,832.

We claim:

1. An adjustable seating unit for use in a passenger-carrying vehicle, said adjustable seating unit comprising
   a support frame which is mountable in a vehicle,
   a backrest part and a bottom part mounted on said support frame, said backrest part and said bottom part each defining seating surfaces and each having opposite sides, said backrest part and said bottom part providing at least two seating areas between said opposite sides thereof, first and second fixed armrests respectively mounted on said support frame at said opposite sides of said backrest and bottom parts, a pair of intermediate armrests mounted on said support frame for defining at least two separated seating areas, each armrest being laterally movable to at least two laterally spaced positions to adjust the widths of the defined seating areas, and a shroud fixedly connected to the support frame so as to be movable from a stored position to an operative position wherein it contacts and rests on top of said pair of intermediate armrests when said armrests are respectively laterally positioned closest to one another.

2. An adjustable seating unit as claimed in claim 1 wherein said laterally-spaced positions are such that, when said intermediate armrests are each located in laterally-spaced positions which are farthest apart, said fixed armrests and said intermediate armrests are substantially equally spaced to define narrower seating areas between them, and when said intermediate armrests are each located in laterally-spaced positions which are closest together, said pair of intermediate armrests together define and separate two wider seating areas.

3. An adjustable seating unit as claimed in claim 1 including a movable portion permitting said shroud to move between said operative and stored positions and at least partially concealing said shroud when it is in said stored position.

4. An adjustable seating unit as claimed in claim 3 wherein said pair of intermediate armrests is pivotally connected to said adjustable seating unit.

5. An adjustable seating unit as claimed in claim 4, wherein said pair of intermediate armrests is pivotally connected to said support frame.

6. An adjustable seating unit as claimed in claim 4, wherein said shroud is slidably mounted on said pair of intermediate armrests.

7. An adjustable seating unit as claimed in claim 4, wherein said intermediate armrests are articulated.

8. An adjustable seating unit as claimed in claim 3, wherein said movable portion of the adjustable seating unit is a portion of the backrest part.

9. An adjustable seating unit as claimed in claim 8, wherein said shroud carries on its surface which will be outermost in said stored position a portion of upholstery to form a continuation of the seating surface of the backrest part and to complete concealment of said shroud in said stored position.

10. An adjustable seating unit as claimed in claim 3, wherein said movable portion of the adjustable seating unit is a portion of said bottom part.

* * * * *